(12) United States Patent
Bowley

(10) Patent No.: US 12,072,225 B2
(45) Date of Patent: Aug. 27, 2024

(54) EXTERNAL SOLIDS LEVEL DETECTION FOR A COLLECTION VESSEL

(71) Applicant: ENERCORP SAND SOLUTIONS INC., Calgary (CA)

(72) Inventor: Ryan Thomas Bowley, Calgary (CA)

(73) Assignee: ENERCORP ENGINEERED SOLUTIONS INC., Calgary (CA)

( * ) Notice: Subject to any disclaimer, the term of this patent is extended or adjusted under 35 U.S.C. 154(b) by 831 days.

(21) Appl. No.: 16/104,548

(22) Filed: Aug. 17, 2018

(65) Prior Publication Data

US 2019/0063984 A1   Feb. 28, 2019

Related U.S. Application Data

(60) Provisional application No. 62/552,776, filed on Aug. 31, 2017.

(51) Int. Cl.
*G01F 23/296*     (2022.01)
*B01D 21/26*      (2006.01)
(Continued)

(52) U.S. Cl.
CPC ....... *G01F 23/2962* (2013.01); *B01D 21/267* (2013.01); *B01D 21/34* (2013.01);
(Continued)

(58) Field of Classification Search
CPC ... G01V 1/44; G01V 1/22; G01V 1/52; B01D 21/267; B01D 21/34; B01D 2311/04; B01D 2311/2642; B01D 2311/2649; B01D 2311/2676; B01D 2311/2684; B01D 2321/00; B01D 2321/16; B01D 2321/40; B01D 61/145; B01D 61/16; B01D 65/02; B01D 71/021; B01D 71/56; B01D 21/32;
(Continued)

(56) References Cited

U.S. PATENT DOCUMENTS

| 6,213,208 B1 * | 4/2001 | Skilbeck ............... B01D 17/00 166/265 |
| 2009/0056939 A1 * | 3/2009 | Hackworth .......... E21B 43/385 166/265 |

(Continued)

FOREIGN PATENT DOCUMENTS

CN             203964991 U   * 11/2014

*Primary Examiner* — Dirk R Bass
(74) *Attorney, Agent, or Firm* — MH2 TECHNOLOGY LAW GROUP, LLP

(57) ABSTRACT

A mixed fluid collection apparatus includes a collection vessel configured to contain a fluid comprising a first component and a second component. The collection vessel includes an outer shell within which the fluid is contained. An emitter is coupled to an outside of the outer shell at a first position, and is configured to emit an acoustic signal into the outer shell. A receiver is coupled to the outside of the outer shell at a second position, with the receiver being configured to detect the acoustic signal emitted by the emitter. A controller is coupled to the emitter and the receiver. The controller is configured to determine a time between when the acoustic signal is emitted and when the acoustic signal is detected, and the controller is configured to determine a level of the second component in the collection vessel based on the time.

24 Claims, 5 Drawing Sheets

(51) Int. Cl.
  *B01D 21/34* (2006.01)
  *B04C 1/00* (2006.01)
  *B04C 5/185* (2006.01)
  *B04C 11/00* (2006.01)
  *C02F 1/00* (2023.01)
  *C02F 1/38* (2023.01)
  *G01F 23/2962* (2022.01)
  *C02F 103/10* (2006.01)

(52) U.S. Cl.
  CPC ............... *B04C 1/00* (2013.01); *B04C 5/185* (2013.01); *B04C 11/00* (2013.01); *C02F 1/008* (2013.01); *C02F 1/385* (2013.01); *C02F 2103/10* (2013.01); *C02F 2209/005* (2013.01); *C02F 2209/42* (2013.01)

(58) Field of Classification Search
  CPC ....... B01D 19/0042; B04C 11/00; B04C 1/00; B04C 5/185; C02F 1/008; C02F 1/385; C02F 2103/10; C02F 2209/005; C02F 2209/42; C02F 11/12; C02F 1/001; C02F 1/004; C02F 1/24; C02F 1/38; C02F 1/40; C02F 1/444; C02F 1/463; C02F 1/52; C02F 2101/20; C02F 2101/32; C02F 2103/365; C02F 2201/008; C02F 2301/08; C02F 2303/04; C02F 2303/16; C02F 2303/24; C02F 9/00; C02F 9/005; C25B 13/04; C25B 1/04; E21B 37/06; E21B 41/02; E21B 43/121; E21B 43/122; E21B 43/14; E21B 43/17; E21B 43/385; E21B 47/008; E21B 47/017; E21B 47/06; E21B 47/09; E21B 47/107; E21B 47/113; E21B 47/13; E21B 47/135; E21B 47/14; E21B 49/08; E21B 43/34; G01F 23/2962; G01F 1/662; G01F 1/66; G01F 23/2961; G21B 1/15; G21B 3/00; H01L 31/0725; H01L 31/0735; H02S 40/22; H02S 40/32; H02S 40/38; H02S 40/42; H05H 1/24; H05H 2277/13; Y02E 10/52; Y02E 10/544; Y02E 30/10; Y02E 60/36; Y02E 70/30; G01N 27/22; G01N 9/30; G01N 33/2823; B03B 5/34

See application file for complete search history.

(56) References Cited

U.S. PATENT DOCUMENTS

| | | | |
|---|---|---|---|
| 2009/0159272 A1* | 6/2009 | Auzerais | G01V 1/44 166/250.01 |
| 2011/0146413 A1* | 6/2011 | Masek | G01N 9/30 73/861.04 |
| 2012/0018167 A1* | 1/2012 | Konopczynski | E21B 43/14 166/369 |
| 2016/0320226 A1* | 11/2016 | Schaefer | G01F 23/2962 |
| 2017/0158538 A1* | 6/2017 | Seth | B01D 71/56 |
| 2018/0058191 A1* | 3/2018 | Romer | E21B 47/008 |
| 2018/0306018 A1* | 10/2018 | Renick | E21B 7/02 |

\* cited by examiner

EXTERNAL SOLIDS LEVEL DETECTION FOR A COLLECTION VESSEL

CROSS REFERENCE TO RELATED APPLICATIONS

This application claims priority to U.S. Provisional Patent Application having Ser. No. 62/552,776, which was filed on Aug. 31, 2017 and is incorporated herein by reference in its entirety.

BACKGROUND

Hydraulic fracturing is a well-treatment process in which preferential flowpaths for hydrocarbons are established in a subterranean rock formation by pumping a fluid at high pressures into a well to initiate fractures in the rock formation. The fluid is predominately water, but may also include solids, such as sand or ceramic proppants, which at least partially fill the fractures and maintain the preferential flowpaths.

When oil or other fluids are produced/recovered from the well, it may be desirable to remove sand or other solids from the produced fluid. A separator system is employed to perform this function. One type of separator system used for this application is a cyclone separator. The cyclone separator operates at steady state by imparting a generally helical flowpath in a fluid. In such a flow, the denser particulate matter migrates to the outside because of its greater inertia, while the less-dense liquids and gases may flow inward to an outlet.

These separator systems have maintenance requirements, however. For example, the solids separated from the fluid within the system are typically deposited into a collection vessel, along with some of the fluids. These solids need to be removed from the collection vessel from time to time. This is referred to as "blowdown." The separator system generally goes offline to allow for such maintenance, and thus, during a blowdown, the separator may be bypassed (e.g., if a backup system is available), or the production may be halted. Accordingly, it is desirable to blowdown the collection vessel as infrequently as possible. However, if the solids are not removed frequently enough, the sand (or other solids) can overfill the collection vessel and interfere with the operation of the separator.

In low-pressure systems, the sand level in the collection vessel can be determined using sensors positioned within the collection vessel. For example, a vibrating fork can be used, the resonating frequency of which changes depending on the environment in which it is disposed. Electrical resistance detectors and other electric sensors can also be used to detect a fluid composition within the collection vessel. However, in high-pressure applications, piercing the pressure collection vessel to connect these sensors within the collection vessel may be undesirable. Other sensors have thus been developed, generally relying on nuclear technology to acquire data about the contents of the collection vessel; however, while these systems are used effectively, they have high regulatory and safety requirements.

SUMMARY

Embodiments of the disclosure may provide a mixed fluid collection apparatus. The apparatus includes a collection vessel configured to contain a fluid comprising a first component and a second component. The collection vessel includes an outer shell within which the fluid is contained. The apparatus includes an emitter coupled to an outside of the outer shell at a first position. The emitter is configured to emit an acoustic signal into the outer shell. The apparatus includes a receiver coupled to the outside of the outer shell at a second position, the second position being offset from the first position, the receiver being configured to detect the acoustic signal emitted by the emitter. The apparatus includes a controller coupled to the emitter and the receiver. The controller is configured to determine a time between when the acoustic signal is emitted and when the acoustic signal is detected, and the controller is configured to determine a level of the second component in the collection vessel based on the time.

Embodiments of the disclosure may also provide a method including receiving a first component and a second component of a mixed fluid in a cylindrical collection vessel. The second component settles to the bottom of the collection vessel, and wherein a level of the second component increases over time. The method includes emitting an acoustic signal from an emitter positioned at a first level and at a first circumferential position on an outside of the cylindrical collection vessel, detecting the acoustic signal using a receiver positioned at a second circumferential position on the outside of the cylindrical collection vessel, and determining that the level of the second component has reached at least the level of the emitter based on a time between when the acoustic signal is emitted by the emitter and when the acoustic signal is detected by the receiver.

Embodiments of the disclosure may further provide a sand separator system including a cyclone separator configured to separate a first component from a second component in a mixed fluid, a collection vessel configured to receive the second component and at least a portion of the first component from the cyclone separator, and an emitter coupled to an outside of the collection vessel at a first position. The emitter is configured to emit an acoustic signal into the collection vessel. The system includes a receiver coupled to the outside of the collection vessel at a second position, the second position being offset from the first position, the receiver being configured to detect the acoustic signal emitted by the emitter. The system includes a controller coupled to the emitter and the receiver. The controller is configured to determine a time between when the acoustic signal is emitted and when the acoustic signal is detected, and the controller is configured to determine a level of the second component in the collection vessel based on the time.

The foregoing summary is intended merely to introduce some aspects of the following disclosure and is thus not intended to be exhaustive, identify key features, or in any way limit the disclosure or the appended claims.

BRIEF DESCRIPTION OF THE DRAWINGS

The present disclosure may best be understood by referring to the following description and accompanying drawings that are used to illustrate embodiments of the invention. In the drawings.

DETAILED DESCRIPTION

Figure 1:
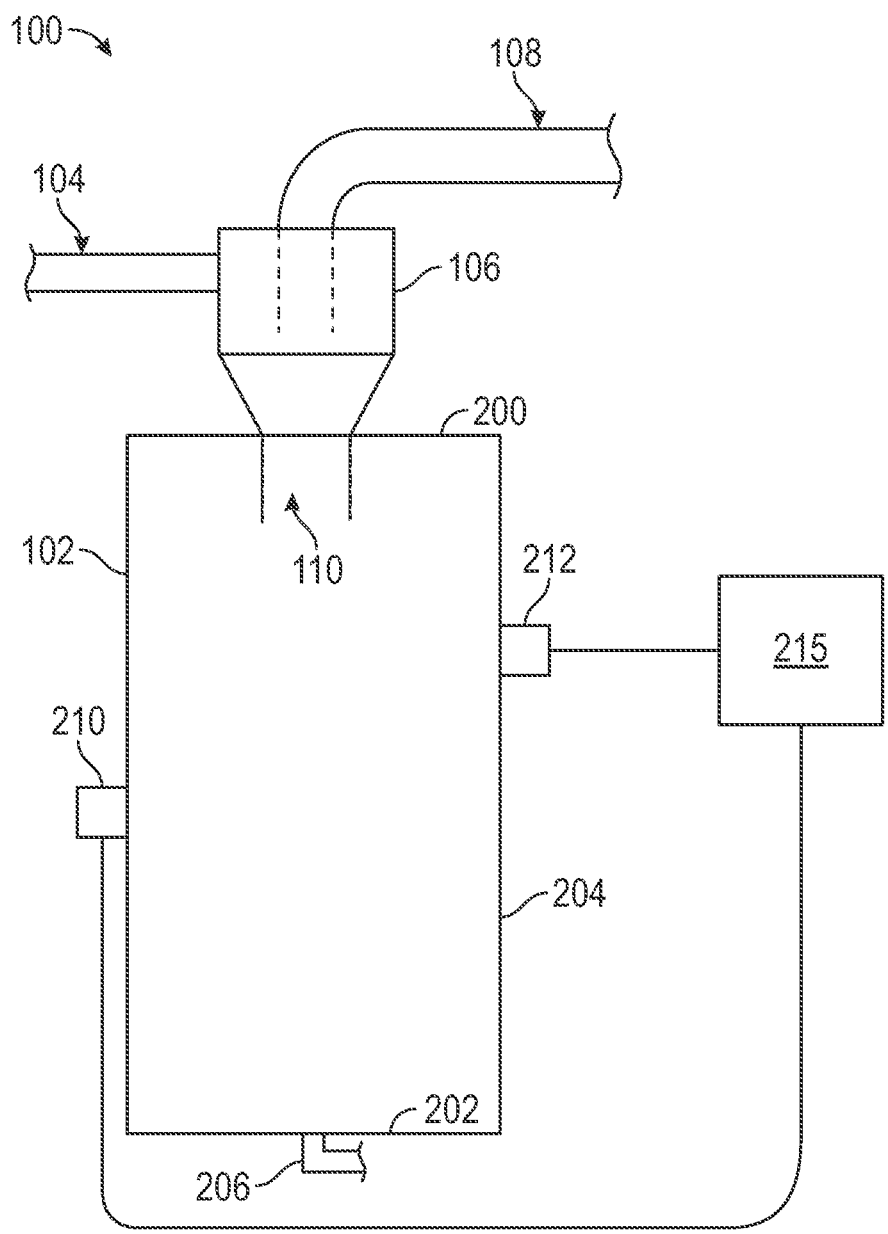
FIG. 1 illustrates a sand separation system including an external sand-level monitor, according to an embodiment.

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

FIG. 1 illustrates a side, schematic view of a separator system 100 having a collection vessel 102 and an external, component-level monitor, according to an embodiment. The separator system 100 may include an inlet 104, a cyclone 106, a first outlet 108, and a second outlet 110. The separator system 100 may be configured to separate components of a mixed fluid. In various applications, the mixed fluid could also be considered a slurry or a multiphase fluid including, potentially, liquids (e.g., oil and water), solids, and or gases; thus, the term "mixed fluid" as it is used herein is intended to broadly refer to all such possibilities. In a specific embodiment, the components of the mixed fluid may include particulates such as sand, along with a fluid such as water, water-based solutions, hydrocarbons, etc. The particulates may be suspended in the fluid, and the separator system 100 may generally be configured for separating the sand (or other solids) from the fluid.

Accordingly, the mixed fluid may be received through the inlet 104 and swirled in the cyclone 106. Most of the less-dense fluid may migrate to the center of the cyclone 106 and may exit the cyclone 106 via the first outlet 108. Further, most of the denser, particulate components may drop out of the second outlet 110, falling into the collection vessel 102. At least some of the fluid may exit the cyclone 106 via the second outlet 110 and may also flow into the collection vessel 102. Generally, during a start-up phase, when the collection vessel 102 is empty, the fluid may flow into the collection vessel 102 via the second outlet 110 until reaching the level of the second outlet 110. Thereafter, the fluids may flow into the first outlet 108, while the solids continue to drop out into the collection vessel 102.

The collection vessel 102 may contain the components of the mixed fluid, in a generally non-flowing or "quiescent" state. By "generally quiescent," it is meant that the fluid is not rapidly flowing, although some movement may be allowed, e.g., as while receiving the fluid from the second outlet 110.

The collection vessel 102 may be generally cylindrical, although other shapes for the collection vessel 102 are contemplated herein (e.g., spherical). The collection vessel 102, in an embodiment, may include a top 200, a bottom 202, and a circumferential sidewall 204 extending therebetween, which together define the outer housing or "outer shell" of the collection vessel 102. In some embodiments, the bottom 202 may be conical, convex, or otherwise shaped to promote solids that settle at the bottom 202 moving by gravity to a blowdown outlet 206, which may, in some embodiments, be centrally-located at the bottom 202. Such geometry for the bottom 202 of the collection vessel 102 is considered within the scope of the term "generally cylindrical."

Further, the collection vessel 102 may be configured to receive the mixed fluid from the second outlet 110 through the top 200, as shown, but in other embodiments, may receive the mixed fluid through an opening in the sidewall 204 or the bottom 202. The collection vessel 102 may be configured to contain fluid (and particulate matter) at a relatively high pressure, e.g., from about 1,000 psi to about 15,000 psi, e.g., about 5,000 psi or about 10,000 psi.

When opened, the blowdown outlet 206 may allow the mixed fluid to exit the collection vessel 102. Thereafter, the mixed fluid may be transferred to a truck or another, low-pressure tank for further processing and/or disposal.

In order to monitor the level of the solids in the collection vessel 102, an emitter 210 and a receiver 212 may be coupled to an exterior of the collection vessel 102. Although a single emitter 210 and a single receiver 212 are shown, it will be appreciated that two or more of either or both of the emitter 210 and receiver 212 may be employed (e.g., multiple pairs at different levels/elevations). In an embodiment, the emitter 210 and the receiver 212 may be positioned on the sidewall 204. The emitter 210 may be located at a first position on the sidewall 204, and the receiver 212 may be located at a second position on the sidewall 204. The first and second positions may be circumferentially offset around the sidewall 204. For example, the first and second positions may be about 180 degrees apart around the sidewall 204, although this is only one example, and deviations from such circumferential offset may be employed.

Furthermore, the first and second positions may be axially (parallel to a central line extending between the top 200 and the bottom 202, around which the sidewall 204 is defined) offset from one another. For example, as shown, the emitter 210 may be vertically lower than the receiver 212, but in other embodiments, the reverse of the relative elevations (levels) of the emitter 210 and the receiver 212 may be employed.

The emitter 210 and the receiver 212 may be acoustic transducers. The emitter 210 may be configured to emit an acoustic pulse, directed into the sidewall 204. The acoustic pulse may be ultrasonic, but in other embodiments, may be in any suitable frequency range. The receiver 212 may be configured to detect the acoustic pulse. For example, the emitter 210 and the receiver 212 pair may be similar in operation to an ultrasonic flow meter but used to detect the level. By way of background, the ultrasonic flow meters may generally use the Doppler shift to determine volumetric flow rate in mixed fluids (e.g., slurries, liquids with bubbles, and/or gases with particles entrained), e.g., as they flow through a pipe. The frequency of the transmitted signal is affected by the movement of the fluid, and the emitted frequency is compared to the received frequency, with the difference between the two frequencies being indicative of the volumetric flow rate. However, in a non-flowing, generally quiescent fluid situation, the emitter 210 and receiver 212 may not be employed to detect volumetric flowrate, but rather may measure the travel time for the acoustic signal between the emitter 210 and the receiver 212, which may be indicative of the medium through which the signal travels. In some embodiments, the emitter 210 and receiver 212 may employ the Doppler shift for certain calculations as well.

A controller 215 may thus be coupled to the emitter 210 and/or the receiver 212. The emitter 210 and the receiver 212 may be configured to communicate with the controller 215. For example, the controller 215 may instruct the emitter 210 to emit one or more acoustic pulses and may record when the emitter 210 emits the pulse(s). The controller 215 may also record when the receiver 212 registers the pulse. With the positions of the emitter 210 and receiver 212 (including a distance therebetween) known, the propagation speed of the acoustic pulse may be calculated based on the time between pulse emission and pulse reception.

Figure 2A:
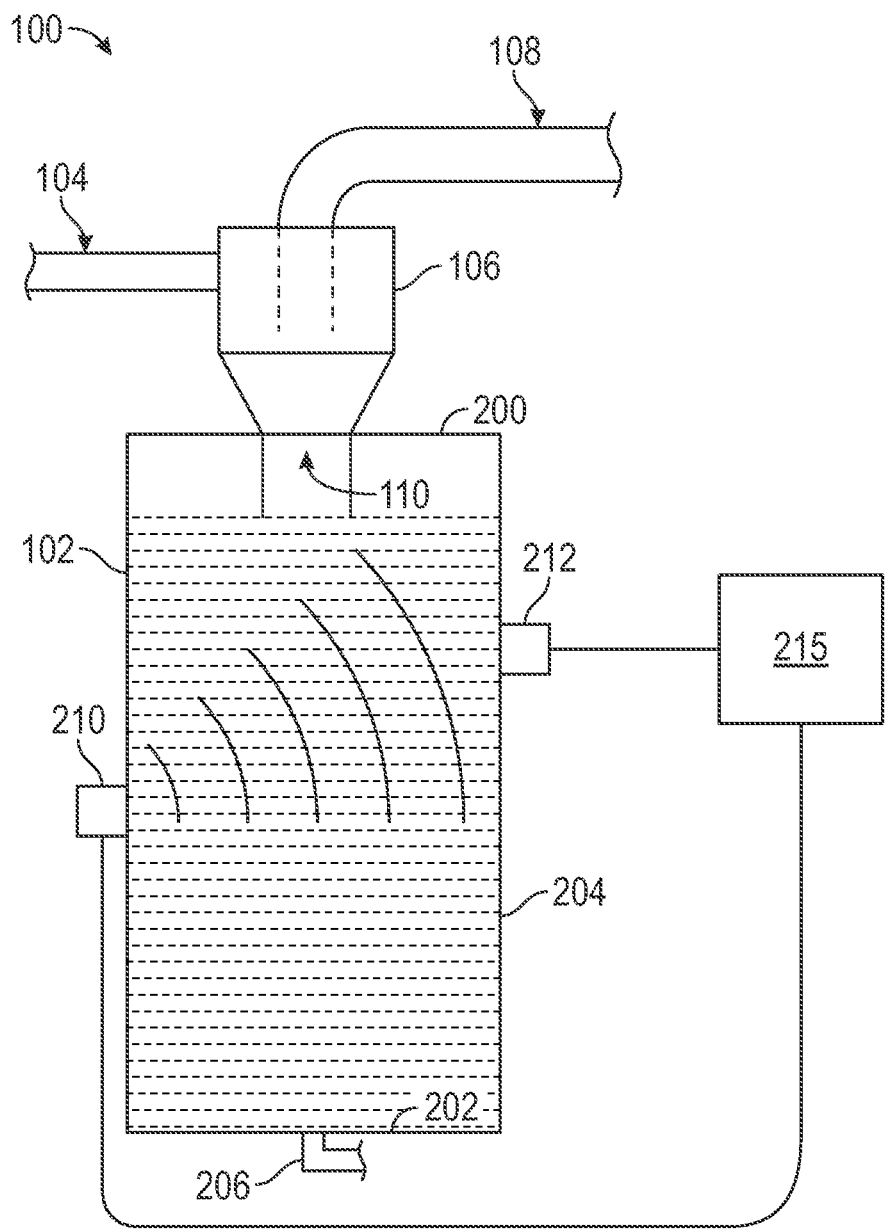
FIG. 2A illustrates the sand separation system including the external sand-level monitor, in which a first (liquid) component of a mixed fluid is received, according to an embodiment.
Figure 2B:
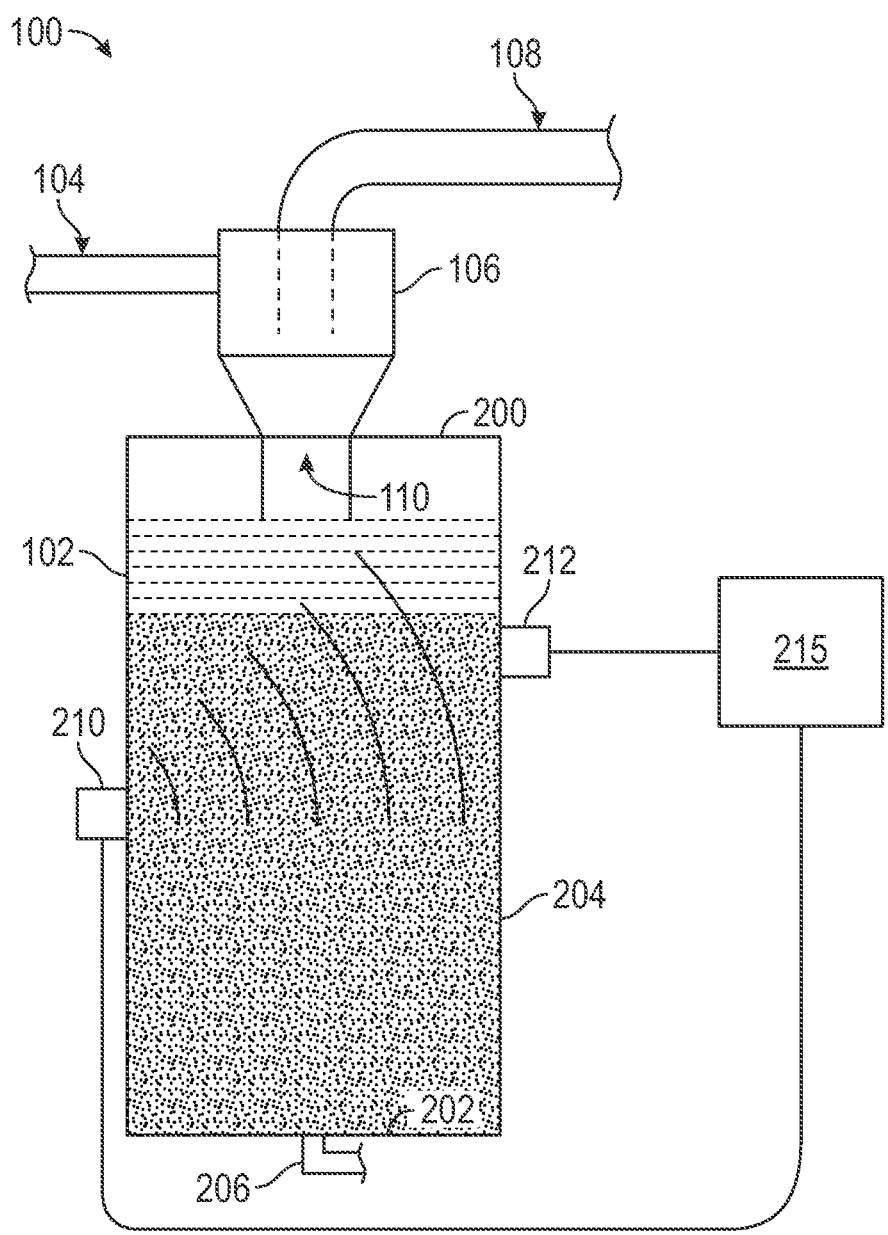
FIG. 2B illustrates the sand separation system including the external sand-level monitor, in which a second (e.g., sand) component of the mixed fluid is received, in addition to the first component, according to an embodiment.

The signal propagation speed may be proportional, at least in part, to the composition of the mixed fluid relative to the level of the first and second positions, as well as the material and thickness of the sidewall 204 (the latter being a static, known parameter). For example, as shown in FIG. 2, the mixed fluid in the collection vessel 102 may initially be substantially liquid. Thus, the acoustic pulse from the emitter 210 travels through the sidewall 204, then through the liquid contents within the collection vessel 102, then again through the sidewall 204, and to the receiver 212. At least a portion of the energy of the acoustic pulse may not travel through the liquid, but may remain in the sidewall 204, propagating therein from the emitter 210 to the receiver 212. However, the propagation speed may be significantly different than for the acoustic energy that travels through the liquid, and thus this portion of the acoustic energy may be distinguished.

As the separator system 100 operates, the particulate component of the mixed fluid in the collection vessel 102 increases. In some embodiments, in the generally quiescent fluid of the collection vessel 102, the particulate component settles to the bottom 202 of the collection vessel 102. The level of the particulate component thus rises over time, during operation of the separator system 100. Eventually, the vertical level (elevation) of the particulate may exceed the level of the first position of the emitter 210, and/or the level of the second position of the receiver 212. Thus, at least a portion of the acoustic pulses may propagate through the particulate component, instead of the fluid component. For example, if the level of the particulate component exceeds the level of the emitter 210, the acoustic pulses recorded by the receiver 212 may either travel through the particulate matter or through the sidewall 204, as mentioned above. Neglecting the energy that travels through the sidewall 204, the propagation speed of the acoustic energy that travels through the particulate component may be determined, and it may differ from that of the acoustic energy that travelled through the liquid component. The controller 215 may thus determine when the particulate matter reaches the level of the emitter 210, the level of the receiver 212, or both.

In some cases, the emitter 210 may not produce sufficient acoustic energy for the acoustic pulses to travel through the particulate component. For example, the presence of the particulate component in the path between the emitter 210 and the receiver 212 may interfere with the reception of the acoustic pulses, e.g., by dispersion, refraction, reflection, or other mode of energy dissipation. Accordingly, when the particulate component obstructs the straight-line path between the first and second positions, the receiver 212 may not detect an acoustic pulse that travels through the mixed fluid. Rather, the receiver 212 may detect only the acoustic pulses that travel within the sidewall 204, e.g., around the collection vessel 102. As noted above, these pulses are distinguished from pulses that proceed through the mixed fluid in the collection vessel 102 based on a significant difference in travel time.

The controller 215 may thus be configured to communicate with the emitter 210 and the receiver 212 in order to determine the level of the particulate component of the mixed fluid that has been received into the collection vessel 102. For example, when the controller 215 determines that the duration between emission and reception changes by at least a threshold amount, for at least a threshold time (e.g., to avoid false positive detections due to noise), the controller 215 may determine that the particulate component level is at least as high as the lower of the first and second positions. In another embodiment, when the controller 215 determines that the acoustic pulse is not travelling through the mixed fluid, but rather is travelling solely through the sidewall 204 (and/or top 200 and/or bottom 202), not through the mixed fluid, the controller 215 may similarly determine that the level of the particulate component is higher than the first position and/or the second position.

In at least some embodiments, the solids level may additionally be monitored based on a weight of the collection vessel 102. This may provide a secondary data point related to the amount of solids in the collection vessel 102. The weight and geometry of the empty vessel 102 may be known. Further, the densities of the liquid and solid components of the mixed fluid may also be known, and thus the relative amounts of liquid and solids in the vessel 102 may be determined.

Figure 3:
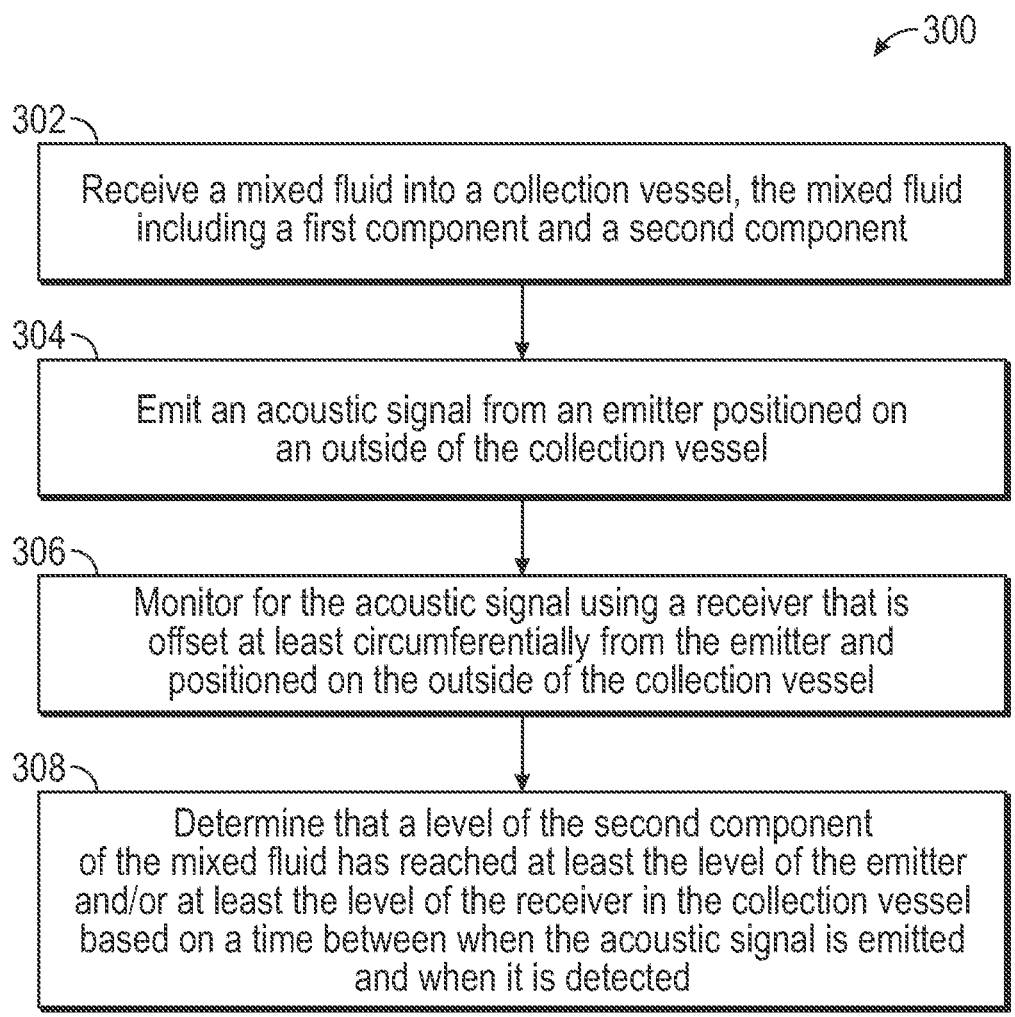
FIG. 3 illustrates a flowchart of a method for monitoring a level of a component of a mixed fluid in a collection vessel, according to an embodiment.

FIG. 3 illustrates a flowchart of a method 300 for monitoring a level of a separated component of a mixed fluid in a collection vessel, according to an embodiment. The method 300 may include receiving a mixed fluid including a first component (e.g., liquid such as water) and a second component (e.g., solid such as sand) in a cylindrical collection vessel 102, as at 302. The second component separates (e.g., by settling) from the first component, and a level of the second component in the collection vessel 102 increases over time.

The method 300 includes emitting an acoustic signal from an emitter 210 positioned at a first level and at a first circumferential position on an outside (e.g., of the sidewall 204) of the cylindrical collection vessel 102, as at 304. The method 300 includes detecting the acoustic signal using a receiver positioned at a second circumferential position on the outside (e.g., of the sidewall 204) of the cylindrical collection vessel 102, as at 306.

The method 300 further includes determining that the level of the second component has reached at least the level of the emitter, or at least the level of the receiver, or both, based on a time between when the acoustic signal is emitted and when the acoustic signal is detected, as at 308. For example, the time may decrease when the second component is between the receiver and the emitter, as the medium may result in a higher speed of sound therethrough. In another example, the time may become essentially infinite, as the receiver 212 may not detect the acoustic signal, except as propagated through the wall of the cylindrical collection vessel 102 itself. Another way of considering this is to determine propagation speed, which is indicated by the time duration and the known distance between the emitter 210 and the receiver 212. When the acoustic signals are emitted and received, the material properties therebetween may be implied based on the speed of sound therein. Since the material properties of the collection vessel 102 may be known, the remaining unknown, the material properties of the mixed fluid between the emitter 210 and the receiver 212 may thus be calculated.

In some embodiments, a baseline or calibration time may be determined for acoustic signal propagation through the vessel 102, e.g., when empty, when mostly full of liquid, or both. When the duration changes by a certain, threshold amount from the baseline or calibration time, it may be indicative that the acoustic signal is now propagating through a different medium, e.g., through the second component. In other embodiments, a preprogrammed or otherwise predetermined absolutely threshold time may be determined, and thus times below (or potentially above) the threshold may indicate that the medium has changed.

The specific material properties may not need to be calculated, however, as it may be sufficient to establish that the time (or propagation speed) has reached a threshold for a certain duration (e.g., to account for noise). For example, if the time reaches a predetermined threshold, under (or potentially over) which it is expected that the second component Optionally, the method 300 may be part of a sand separation process, and thus the method 300 may, in some embodiments, include separating at least some of the second component from the first component prior to receiving the mixture in the cylindrical collection vessel 102. The second component, and at least some of the first component, may be received into the cylindrical collection vessel 102, and may be in a generally quiescent state, in comparison to, e.g., flow through a pipe, which may be laminar or turbulent, but is generally flowing from one location to another, whereas the mixed fluid in the collection vessel 102 is generally not.

Figure 4:
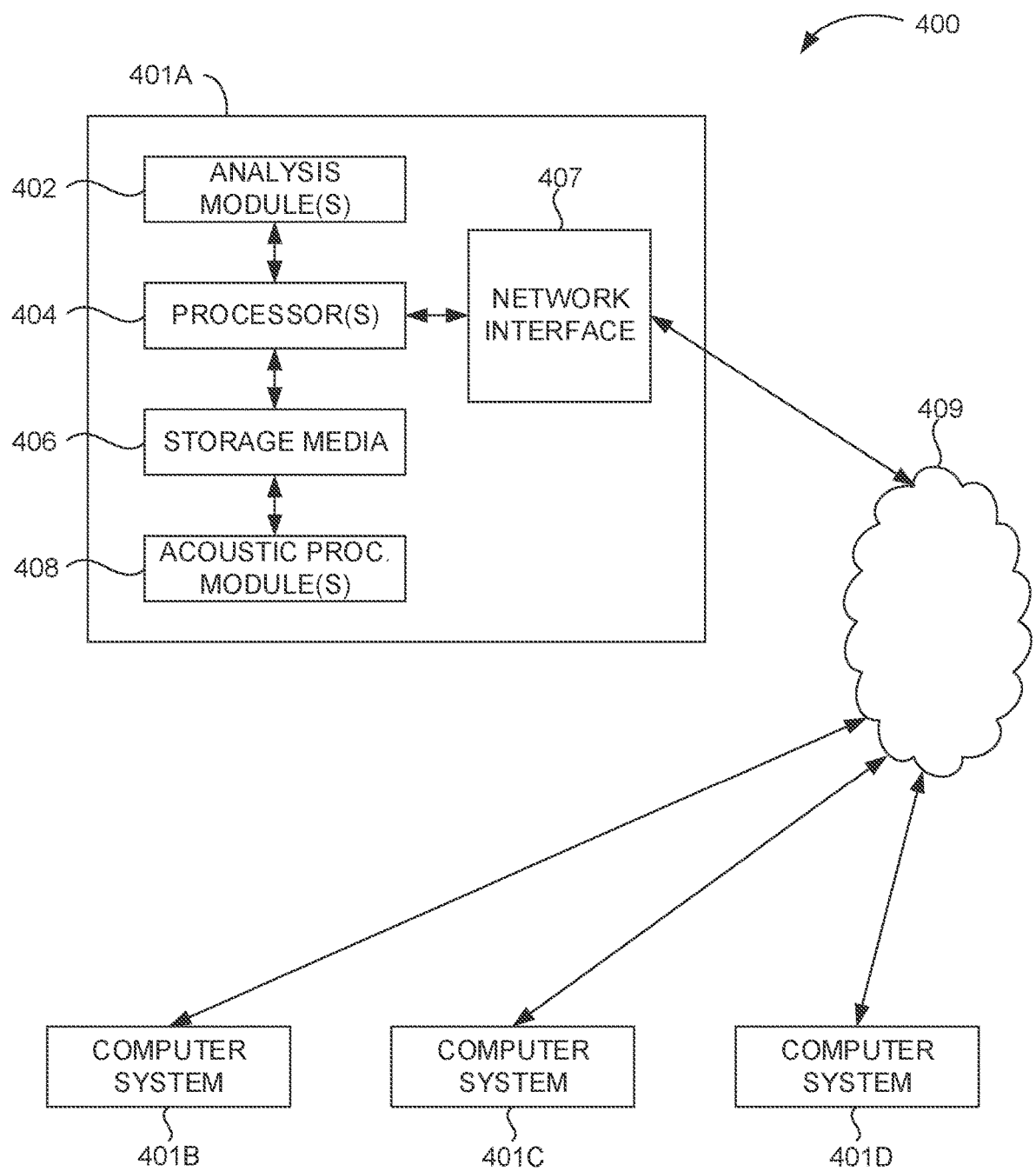
FIG. 4 illustrates a schematic view of a computer processor, depicting an embodiment of the controller of the sand separation system, according to an embodiment.

In some embodiments, any of the methods of the present disclosure may be executed by a computing system. FIG. 4 illustrates an example of such a computing system 400, in accordance with some embodiments. The computing system 400 may include a computer or computer system 401A, which may be an individual computer system 401A or an arrangement of distributed computer systems. The computer system 401A includes one or more analysis module(s) 402 configured to perform various tasks according to some embodiments, such as one or more methods disclosed herein. To perform these various tasks, the analysis module 402 executes independently, or in coordination with, one or more processors 404, which is (or are) connected to one or more storage media 406. The processor(s) 404 is (or are) also connected to a network interface 407 to allow the computer system 401A to communicate over a data network 409 with one or more additional computer systems and/or computing systems, such as 401B, 401C, and/or 401D (note that computer systems 401B, 401C and/or 401D may or may not share the same architecture as computer system 401A, and may be located in different physical locations, e.g., computer systems 401A and 401B may be located in a processing facility, while in communication with one or more computer systems such as 401C and/or 401D that are located in one or more data centers, and/or located in varying countries on different continents).

A processor can include a microprocessor, microcontroller, processor module or subsystem, programmable integrated circuit, programmable gate array, or another control or computing device.

The storage media 406 can be implemented as one or more computer-readable or machine-readable storage media. Note that while in the example embodiment of FIG. 4 storage media 406 is depicted as within computer system 401A, in some embodiments, storage media 406 may be distributed within and/or across multiple internal and/or external enclosures of computing system 401A and/or additional computing systems. Storage media 406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 400 contains one or more acoustic processing module(s) 408. In the example of computing system 400, computer system 401A includes the acoustic processing module 408. In some embodiments, a single acoustic processing module may be used to perform some or all aspects of one or more embodiments of the methods. In alternate embodiments, a plurality of acoustic processing modules may be used to perform some or all aspects of methods.

It should be appreciated that computing system 400 is only one example of a computing system, and that computing system 400 may have more or fewer components than shown, may combine additional components not depicted in the example embodiment of FIG. 4, and/or computing system 400 may have a different configuration or arrangement of the components depicted in FIG. 4. The various components shown in FIG. 4 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A mixed fluid collection apparatus, comprising:
   a collection vessel configured to be coupled to a sand separator, to receive a fluid therefrom, and to at least partially contain the fluid, the fluid comprising a first component and a second component, the second component comprising solid particulates, wherein the collection vessel includes an outer shell within which the fluid is contained;
   an emitter coupled to an outside of the outer shell at a first position, wherein the emitter is configured to emit an acoustic signal into the outer shell;
   a receiver coupled to the outside of the outer shell at a second position, the second position being offset from the first position, the receiver being configured to detect the acoustic signal emitted by the emitter; and
   a controller coupled to the emitter and the receiver, wherein the controller is configured to determine a time between when the acoustic signal is emitted and when the acoustic signal is detected, and wherein the controller is configured to determine a vertical level of the solid particulates that have settled in the collection vessel is above a vertical level of the emitter, based on the time.

2. The apparatus of claim 1, wherein the outer shell comprises a circumferential sidewall, the emitter and the receiver being coupled to the sidewall, and wherein the first position is circumferentially offset from the second position around the sidewall.

3. The apparatus of claim 1, wherein outer shell is generally cylindrical, and wherein the first position is axially offset from the second position.

4. The apparatus of claim 1, wherein the first component comprises a liquid.

5. The apparatus of claim 1, wherein the collection vessel is configured to collect and store at least a portion of the fluid.

6. The apparatus of claim 1, wherein the collection vessel is configured to be coupled to a cyclone separator, the cyclone separator being configured to separate the first component from the second component.

7. The apparatus of claim 1, wherein the emitter is configured to emit a series of acoustic waves to produce the acoustic signal.

8. The apparatus of claim 1, wherein, when a level of the first component is at least the same as a level of the emitter, the first component changes a propagation speed of the acoustic signal through the fluid, and wherein the controller is configured to determine a change in the propagation speed.

9. The apparatus of claim 1, wherein, when a level of the second component is at least the same as a level of the emitter, the emitter detects the acoustic signal propagated through the outer shell and not through the fluid.

10. A method, comprising:
    receiving a first component and a second component of a mixed fluid from a cyclone separator into a cylindrical collection vessel that is coupled to the cyclone separator, wherein the second component comprises solid particulates that settle to a bottom of the collection vessel, and wherein a vertical level of the solid particulates increases over time;
    emitting an acoustic signal from an emitter positioned at a first vertical level and at a first circumferential position on an outside of the cylindrical collection vessel;
    detecting the acoustic signal using a receiver positioned at a second circumferential position on the outside of the cylindrical collection vessel; and
    determining that the vertical level of the solids particulates has reached at least the vertical level of the emitter based on a time between when the acoustic signal is emitted by the emitter and when the acoustic signal is detected by the receiver.

11. The method of claim 10, further comprising separating at least some of the second component from the first component prior to receiving the mixed fluid in the cylindrical collection vessel.

12. The method of claim 10, wherein the first component comprises a fluid, wherein at least a portion of the fluid is stored in the collection vessel.

13. The method of claim 10, wherein determining that the level of the second component has reached at least the level of the emitter comprises determining that a propagation speed of the acoustic signal has increased above a predetermined threshold.

14. The method of claim 10, wherein determining that the level of the second component has reached at least the level of the emitter comprises determining that the acoustic signal traveled through an outer shell of the collection vessel and not through an interior of the collection vessel.

15. A separator system, comprising:
a cyclone separator configured to separate a first component from a second component in a mixed fluid, the second component comprises solid particulates;
a collection vessel coupled to the cyclone separator and configured to receive the second component and at least a portion of the first component from the cyclone separator, wherein at least a portion of the solid particulates of the second component settle to a bottom of the collection vessel;
an emitter coupled to an outside of the collection vessel at a first position, wherein the emitter is configured to emit an acoustic signal into the collection vessel;
a receiver coupled to the outside of the collection vessel at a second position, the second position being offset from the first position, the receiver being configured to detect the acoustic signal emitted by the emitter; and
a controller coupled to the emitter and the receiver, wherein the controller is configured to determine a time between when the acoustic signal is emitted and when the acoustic signal is detected, and wherein the controller is configured to determine a level of the solid particulates that has settled to the bottom of the collection vessel based on the time.

16. The system of claim 15, wherein the first component comprises a fluid and the second component comprises a solid.

17. The system of claim 16, wherein the collection vessel is configured to collect the fluid from the cyclone separator.

18. The system of claim 15, wherein, when a level of the first component is at least the same as a level of the emitter, the first component changes a propagation speed of the acoustic wave through the fluid, and wherein the controller is configured to determine a change in the propagation speed.

19. The system of claim 15, wherein, when a level of the second component is at least the same as a level of the emitter, the emitter detects the acoustic wave propagated through an outer shell of the collection vessel and not through the fluid.

20. The system of claim 15, wherein the emitter and the receiver are circumferentially and axially offset from one another with respect to the collection vessel.

21. The apparatus of claim 1, wherein the collection vessel comprises a closed bottom, such that the fluid is prevented from flowing downward through the collection vessel, and wherein the second component settles on the closed bottom during operation.

22. The apparatus of claim 6, wherein the collection vessel is configured to be coupled to a bottom of the cyclone separator so as to receive the fluid therefrom and store the fluid in the collection vessel.

23. The apparatus of claim 1, wherein the vertical level is a distance from a bottom of the collection vessel in a direction parallel to a central axis of the collection vessel.

24. The apparatus of claim 1, wherein the controller is configured to determine, based at least partially on the time, whether the acoustic signal received by the receiver has propagated around the collection vessel and not through the fluid within the collection vessel, and to determine that the vertical level of the solids particulates exceeds the vertical level of the emitter at least partially based on determining that the receiver receiving the acoustic signal that has only propagated in the outer shell.

* * * * *